US010582426B2

(12) United States Patent
Feng

(10) Patent No.: US 10,582,426 B2
(45) Date of Patent: Mar. 3, 2020

(54) METHOD AND DEVICE FOR ANCHOR REPLACEMENT

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/766,277

(22) PCT Filed: Nov. 6, 2015

(86) PCT No.: PCT/CN2015/094046
§ 371 (c)(1),
(2) Date: Apr. 5, 2018

(87) PCT Pub. No.: WO2017/075824
PCT Pub. Date: May 11, 2017

(65) Prior Publication Data
US 2018/0295544 A1    Oct. 11, 2018

(51) Int. Cl.
*H04L 12/28*    (2006.01)
*H04W 36/00*    (2009.01)
(Continued)

(52) U.S. Cl.
CPC ... *H04W 36/0033* (2013.01); *H04W 36/0069* (2018.08); *H04W 36/08* (2013.01);
(Continued)

(58) Field of Classification Search
CPC ............. H04W 36/30; H04W 36/0033; H04W 36/0069; H04W 76/27; H04W 76/30
(Continued)

(56) References Cited

U.S. PATENT DOCUMENTS 8,737,296 B2    5/2014 Palanki
9,699,702 B2 *  7/2017 Fujishiro ............... H04W 16/32
(Continued)

FOREIGN PATENT DOCUMENTS

CN    101064561 A    10/2007
CN    101296487 A    10/2008
(Continued)

OTHER PUBLICATIONS

English Translation of the Written Opinion of the International Search Authority in international application No. PCT/CN2015/094046, dated Aug. 12, 2016.
(Continued)

*Primary Examiner* — John Pezzlo
(74) *Attorney, Agent, or Firm* — Ladas & Parry, LLP

(57) ABSTRACT

Disclosed is a method and device for anchor replacement. The method comprises: a target base station receives an anchor replacement request message transmitted by a source base station, wherein the source base station is a base station corresponding to a serving cell that currently provides a service for a terminal and has control decision making authority, the target base station is a base station corresponding to a secondary cell that is controlled by the serving cell and currently provides a service for the terminal, and the anchor replacement request message is used for requesting to handover the control decision making authority to the target base station; the target base station transmits an anchor replacement acknowledgement message to the source base station, wherein the anchor replacement acknowledgement message is used for acknowledging the anchor replacement request message. By means of the method for anchor replacement of the present invention, a terminal can continue transmitting user data while handover is being performed, and can obtain control signaling from a (Continued)

plurality of base stations, thereby ensuring smooth handover of the terminal, reducing handover latency, and improving the user experience during handover.

20 Claims, 6 Drawing Sheets

(51) Int. Cl.

| | | |
|---|---|---|
| H04W 36/08 | (2009.01) | |
| H04W 76/30 | (2018.01) | |
| H04W 76/27 | (2018.01) | |
| H04W 36/30 | (2009.01) | |
| H04W 36/38 | (2009.01) | |
| H04J 1/16 | (2006.01) | |

(52) U.S. Cl.
CPC ........... *H04W 36/30* (2013.01); *H04W 36/38* (2013.01); *H04W 76/27* (2018.02); *H04W 76/30* (2018.02)

(58) Field of Classification Search
USPC ........................................ 370/252, 331, 386
See application file for complete search history.

(56) References Cited

U.S. PATENT DOCUMENTS

| | | | |
|---|---|---|---|
| 2010/0103821 A1 | 4/2010 | Palanki | |
| 2014/0192771 A1* | 7/2014 | Jung ................. | H04W 36/0083 370/331 |
| 2014/0211756 A1* | 7/2014 | Bontu .................. | H04W 36/04 370/331 |
| 2015/0181479 A1 | 6/2015 | Lin et al. | |
| 2015/0230134 A1 | 8/2015 | Chiba et al. | |
| 2015/0358863 A1 | 12/2015 | Yamamoto et al. | |
| 2016/0227459 A1* | 8/2016 | Fujishiro ............... | H04W 16/32 |
| 2018/0160343 A1* | 6/2018 | Moon ................... | H04W 76/18 |
| 2018/0220319 A1* | 8/2018 | Kim ...................... | H04W 24/10 |

FOREIGN PATENT DOCUMENTS

| | | |
|---|---|---|
| CN | 102197678 A | 9/2011 |
| CN | 102843742 A | 12/2012 |
| CN | 104737584 A | 6/2015 |
| CN | 104754665 A | 7/2015 |
| EP | 2947941 A1 | 11/2015 |
| JP | 2014138286 A | 7/2014 |
| WO | 2014111027 A1 | 7/2014 |
| WO | 2014112513 A1 | 7/2014 |

OTHER PUBLICATIONS

Supplementary European Search Report in European application No. 15907666.0, dated Dec. 21, 2018.
International Search Report in international application No. PCT/CN2015/094046, dated Aug. 12, 2016.
Broadcom Corporation: "Mobility robustness with dual connectivity", 3GPP Draft; R2-132920 (Mobility Robustness With Dual Connectivity), 3rd Generation Partnership Project (3GPP), Mobile Competence Centre; 650, Route des Lucioles ; F-06921 Sophia-Antipolis Cedex; FRA vol. RAN WG2, No. Barcelona, Spain; Aug. 19, 2013-Aug. 23, 2013 Aug. 22, 2013 (Aug. 22, 2013), XP050718615 *section 2 ** figure 1 *.
Alcatel-Lucent et al: "Mobility scenarios for dual connectivity support", 3GPP Draft; R2-140743, 3rd Generation Partnership Project (3GPP), Mobile Competence Centre; 65(:), Route des Lucioles; F-(:)6921 Sophia-Antipolis Cedex; France • vol. RAN WG2, No. Prague, Czech Republic; 2(:)14(:) 21(:)-2(:)14(:)214 9 Feb. 2(:)14 (2C:I14-C:I2-C:I9), XPC:I5c:I792C:I32 *Mobility scenario E * * figure 5 *.
"3rd Generation Partnership Project; Technical Specification Group Radio Access Netwrok; Evolved Universal Terrestrial Radio Access (E-UTRA) and Evolved Universal Terrestrial Radio Access Network (E-UTRAN); Overall description; Stage 2 (Release 12)", 3GPP Draft; 36300-050, 3rd Generation Partnership Project (3GPP), Mobile Competence Centre; 650, Route des Lucioles; F-06921 Sophia-Antipolis Cedex; France Mar. 2-4, 2015 (Mar. 24, 2015), XP050952068.

\* cited by examiner

200

```
┌─────────────────────────────────────────────────────────────┐
│ A target base station receives an anchor handover request   │
│ message sent by a source base station, wherein the source   │
│ base station is a base station corresponding to a serving   │
│ cell which currently provides service for a terminal and    │  S201
│ has a control and decision-making right, the target base    │
│ station is a base station corresponding to an SCell which   │
│ is controlled by the serving cell and currently provides    │
│ service for the terminal, and the anchor handover request   │
│ message is configured to request to handover the control    │
│ and decision-making right to the target base station        │
└─────────────────────────────────────────────────────────────┘
                              │
┌─────────────────────────────────────────────────────────────┐
│ The target base station sends an anchor handover            │
│ acknowledgement message to the source base station, the     │  S202
│ anchor handover acknowledgement message being configured    │
│ to acknowledge the anchor handover request message          │
└─────────────────────────────────────────────────────────────┘
                              │
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ The target base station establishes an RRC connection       │  S203
│ control link with the terminal                               │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ The target base station sends a release message to the      │  S204
│ terminal, Wherein the release message is to indicate the    │
│ terminal to release the source base station                 │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

```
┌─────────────────────────────────────────────────────────────┐
│ A source base station sends an anchor handover request      │
│ message to a target base station, wherein the source base   │
│ station is a base station corresponding to a serving cell   │
│ which currently provides service for a terminal and has a   │
│ control and decision-making right, the target base station  │  S301
│ is a base station corresponding to an SCell which is        │
│ controlled by the serving cell and currently provides       │
│ service for the terminal, and the anchor handover request   │
│ message is configured to request to handover the control    │
│ and decision-making right to the target base station        │
└─────────────────────────────────────────────────────────────┘
                              │
┌─────────────────────────────────────────────────────────────┐
│ The source base station receives an anchor handover         │
│ acknowledgement message sent by the target base station,    │  S302
│ wherein the anchor handover acknowledgement message is      │
│ to acknowledge the anchor handover request message          │
└─────────────────────────────────────────────────────────────┘
```

FIG. 4

METHOD AND DEVICE FOR ANCHOR REPLACEMENT

RELATED APPLICATION

This application is an application under 35 U.S.C. 371 of International Application No. PCT/CN2015/094046 filed on Nov. 6, 2015, the entire contents of which are incorporated herein by reference.

TECHNICAL FIELD

Embodiments of the disclosure relate to the field of communications, and particularly to an anchor handover method and equipment.

BACKGROUND

At present, the wireless communication standardization organization is making discussions on the basis of a latency shortening technology for a Long Term Evolution (LTE) system in a handover process. In an existing LTE system, difficulties leading to handover latencies mainly lie in reconfiguration of a terminal, a source base station and a target base station.

In a conventional art, handover latencies include a downlink synchronization latency, uplink synchronization latency and reconfiguration completion signaling latency on a target base station side after reconfiguration of a terminal is completed. Here, since downlink synchronization focuses on synchronization between the terminal and a target base station, when the target base station is synchronized with a source base station, this step may be ignored. A reconfiguration completion latency is the same as a reconfiguration signaling configuration latency, and the key is a processing latency of the terminal. Therefore, the most important latency is the uplink synchronization latency.

At present, uplink synchronization mainly involves the following steps.

(1) A terminal initiates a contention-free random access flow according to preamble information configured in reconfiguration signaling.

(2) A base station calculates a Timing Advance (TA) of uplink synchronization after receiving the preamble information.

(3) The Base station notifies the TA to the terminal through a Random Access Response (RAR), and allocates an Uplink (UL) grant resource to the terminal.

(4) The terminal uses the configured TA at the UL grant resource to send a reconfiguration completion message.

In the conventional art, a specific optimization solution for the flow includes that:

a soft handover manner is adopted, that is, a behavior of the terminal in an existing LTE system is changed. During reconfiguration of the terminal, entities of Media Access Control (MAC), Radio Link Control (RLC), Packet Data Convergence Protocol (PDCP) and the like are not reset, that is, the terminal still reserves a Radio Resource Control (RRC) connection with a source base station; and meanwhile, the terminal performs downlink synchronization and uplink synchronization at a target base station, sends reconfiguration signaling, and only after the terminal is successfully connected to the target base station, cuts off the RRC connection with the source base station.

In the solution, the TA is obtained by adopting a solution of advanced measurement and calculation by the terminal, that is, after the terminal completes measurement reporting, the base station selects the target base station, and then configures a corresponding resource to the terminal to enable the terminal to perform uplink synchronization resource sending with the target base station, and after receiving such signaling, the target base station calculates the TA, and sends it to a source cell; and the source cell sends a handover command including the TA to the terminal after receiving the TA.

According to the solution, a latency caused by establishment of RRC connections in a handover process may be eliminated, but the terminal is required to support keeping of the RRC connections with both the source base station and the target base station, so that there are made high requirements on functions of the terminal, and complexity of the terminal is increased; and moreover, in the handover process, data transmission between the base station and the terminal is interrupted, so that data transmission efficiency of the system is low, and user experience is poor.

SUMMARY

The embodiments of the disclosure provide an anchor handover method and equipment, which may ensure smooth handover of a terminal, reduce a handover latency and improve user experience during handover.

In a first aspect, an anchor handover method is provided, which may include that:

a target base station receives an anchor handover request message sent by a source base station, wherein the source base station may be a base station corresponding to a serving cell which currently provides service for a terminal and has a control and decision-making right, the target base station may be a base station corresponding to a Secondary Cell (SCell) which is controlled by the serving cell and currently provides service for the terminal, and the anchor handover request message may be configured to request to handover the control and decision-making right to the target base station; and the target base station sends an anchor handover acknowledgement message to the source base station, wherein the anchor handover acknowledgement message is to acknowledge the anchor handover request message.

Here, the anchor handover method of the disclosure may be a part of flow in a base station handover flow, and handover of the base stations may be completed by anchor handover, wherein an anchor refers to a base station with the control and decision-making right over a radio resource, and anchor handover refers to handover between base stations for the control and decision-making right.

Here, the serving cell of the source base station may add a cell corresponding to the target base station as the SCell through a multi-connectivity technology.

In a possible implementation of the first aspect, the method may further include that:

the target base station establishes an RRC connection control link with the terminal; and the target base station sends a release message to the terminal, wherein the release message is to indicate the terminal to release the source base station.

In a possible implementation of the first aspect, after the operation that the target base station sends the anchor handover acknowledgement message to the source base station, the method may further include that:

the target base station sends an indication message to the terminal, the indication message including information indicating that RRC of the source base station is released and/or information indicating that RRC of the target base station is established.

In the possible implementation, the operation that the target base station sends the indication message to the terminal may include that:

the target base station sends the indication message to the terminal through the source base station.

In a possible implementation of the first aspect, after the operation that the target base station receives the anchor handover request message sent by the source base station and before the operation that the target base station sends the anchor handover acknowledgement message to the source base station, the method may further include that:

the target base station receives an indication message sent by the source base station, the indication message including information indicating that RRC of the source base station is released and/or information indicating that RRC of the target base station is established; and the target base station forwards the indication message to the terminal.

In a possible implementation of the first aspect, after the operation that the target base station receives the anchor handover request message sent by the source base station, the method may further include that:

the target base station sends a path switching request to core network equipment according to the anchor handover request message.

In a second aspect, an anchor handover method is provided, which may include that:

a source base station sends an anchor handover request message to a target base station, wherein the source base station may be a base station corresponding to a serving cell which currently provides service for a terminal and has a control and decision-making right, the target base station may be a base station corresponding to an SCell which is controlled by the serving cell and currently provides service for the terminal, and the anchor handover request message may be configured to request to handover the control and decision-making right to the target base station; and the source base station receives an anchor handover acknowledgement message sent by the target base station, wherein the anchor handover acknowledgement message is to acknowledge the anchor handover request message.

In a possible implementation of the second aspect, after the operation that the source base station sends the anchor handover request message to the target base station and before the operation that the source base station receives the anchor handover acknowledgement message sent by the target base station, the method may further include that:

the source base station sends an indication message to the terminal, the indication message including information indicating that RRC of the source base station is released and/or information indicating that RRC of the target base station is established.

In the possible implementation, the operation that the source base station sends the indication message to the terminal may include that:

the source base station sends the indication message to the terminal through the target base station.

In a possible implementation of the second aspect, after the operation that the source base station receives the anchor handover acknowledgement message sent by the target base station, the method may further include that:

the source base station receives an indication message sent by the target base station, the indication message including information indicating that RRC of the source base station is released and/or information indicating that RRC of the target base station is established; and the source base station forwards the indication message to the terminal.

In a possible implementation of the second aspect, before the operation that the source base station sends the anchor handover request message to the target base station, the method may further include that:

the source base station receives a signal strength measurement result reported by the terminal, the signal strength measurement result including strength of a signal which is currently received by the terminal from the cell of the source base station and strength of a signal which is currently received by the terminal from the cell of the target base station; and when the source base station determines that the terminal needs to handover to the target base station according to the signal strength measurement result, the source base station adds the cell corresponding to the target base station as the SCell to enable the source base station and the target base station to simultaneously send user data to the terminal.

In a possible implementation of the second aspect, after the operation that the source base station receives the anchor handover acknowledgement message sent by the target base station, the method may further include that:

the source base station sends a path switching request to core network equipment according to the anchor handover acknowledgement message.

In a third aspect, an anchor handover method is provided, which may include that:

a terminal receives an indication message sent by a source base station or a target base station, the indication message including information indicating that RRC of the source base station is released and information indicating that RRC of the target base station is established, wherein the source base station may be a base station corresponding to a serving cell which currently provides service for the terminal and has a control and decision-making right, and the target base station may be a base station corresponding to an SCell which is controlled by the serving cell and currently provides service for the terminal; and the terminal establishes an RRC connection control link with the target base station.

In a possible implementation of the third aspect, the method may further include that:

the terminal receives a release message sent by the target base station, wherein the release message is to indicate the terminal to release the source base station; and the terminal releases the source base station according to the release message.

In a possible implementation of the third aspect, before the operation that the terminal receives the indication message sent by the source base station or the target base station, the method may further include that:

the terminal reports a signal strength measurement result to the source base station, the signal strength measurement result including strength of a signal which is currently received by the terminal from the cell of the source base station and strength of a signal which is currently received by the terminal from the cell of the target base station.

In a fourth aspect, a base station is provided, which may include a receiving module and sending module, configured to execute the corresponding implementations of the first aspect, the second aspect and the third aspect, wherein the base station may further include a processing module to execute the corresponding implementations.

In a fifth aspect, a base station is provided, which may include a processor, receiver, sender and memory, configured to execute the corresponding implementations of the first aspect, the second aspect and the third aspect, and each device of the base station of the fifth aspect may correspond to the corresponding module of the base station of the fourth aspect.

In a sixth aspect, a base station is provided, which may include a sending module and receiving module, configured to execute the corresponding implementations of the first aspect, the second aspect and the third aspect, wherein the base station may further include a processing module to execute the corresponding implementations.

In a seventh aspect, a base station is provided, which may include a processor, receiver, sender and memory, configured to execute the corresponding implementations of the first aspect, the second aspect and the third aspect, and each device of the base station of the seventh aspect may correspond to the corresponding module of the base station of the sixth aspect.

In an eighth aspect, a terminal is provided, which may include a receiving module and processing module, configured to execute the corresponding implementations of the first aspect, the second aspect and the third aspect, wherein the terminal may further include a processing module to execute the corresponding implementations.

In a ninth aspect, a terminal is provided, which may include a processor, receiver, sender and memory, configured to execute the corresponding implementations of the first aspect, the second aspect and the third aspect, and each device of the terminal of the ninth aspect may correspond to the corresponding module of the terminal of the eighth aspect.

In the first aspect to the ninth aspect and the corresponding implementations, the anchor handover request message may include at least one of following information including context information of the terminal, system information of the serving cell and radio resource configuration information for the terminal.

On the basis of the abovementioned technical solutions, according to the anchor handover method and equipment of the embodiments of the disclosure, the cell of the target base station is the SCell of the cell of the source base station, and the target base station executes anchor handover request receiving and anchor handover acknowledge operations, so that the terminal may continue transmitting the user data at the same time of handover, and may also acquire control signaling from multiple base stations, smooth handover of the terminal is ensured, a handover latency is reduced, and user experience during handover is improved.

BRIEF DESCRIPTION OF DRAWINGS

In order to describe the technical solutions of the embodiments of the disclosure more clearly, the drawings required to be used in descriptions about the embodiments or the conventional art will be simply introduced below. It is apparent that the drawings described below are only some embodiments of the disclosure. Other drawings may further be obtained by those skilled in the art according to these drawings without creative work.

FIG. 3 is a schematic flowchart of an anchor handover method according to another embodiment of the disclosure.

FIG. 4 is a schematic flowchart of an anchor handover method according to another embodiment of the disclosure.

DETAILED DESCRIPTION

Figure 1:
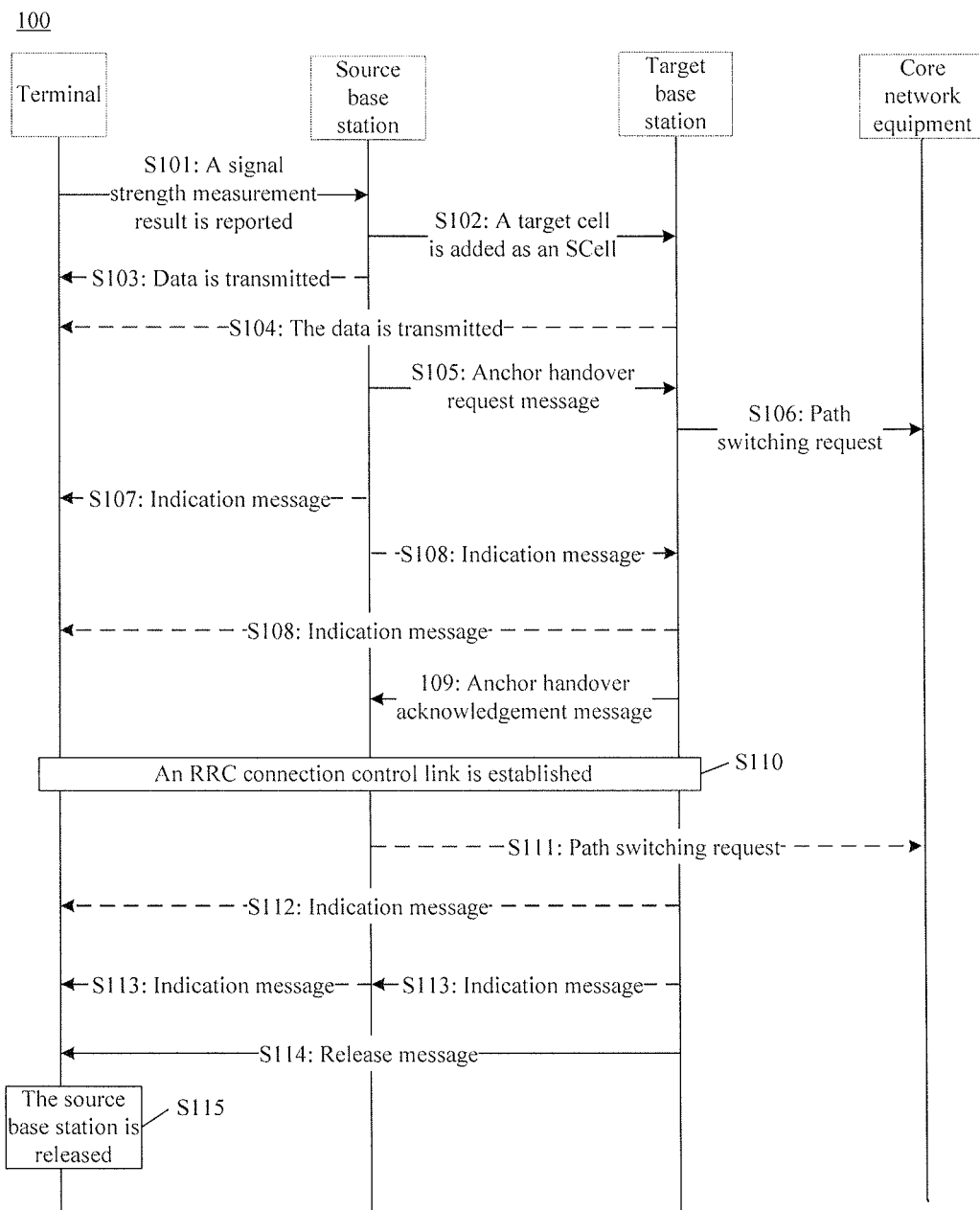
FIG. 1 is a schematic flowchart of an anchor handover method according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those skilled in the art on the basis of the embodiments in the disclosure without creative work shall fall within the scope of protection of the disclosure.

Terms "part", "module", "system" and the like used in the specification are adopted to represent an entity, hardware, firmware, combination of hardware and software, software or software in execution related to a computer. For example, a part may be, but not limited to, a process running on a processor, the processor, an object, an executable file, an execution thread, a program and/or a computer. It is graphically represented that all applications running on computing equipment and the computing equipment may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It should be understood that the technical solutions of the embodiments of the disclosure may be applied to various communication systems, for example: a Global System of Mobile Communication (GSM), a Code Division Multiple Access (CDMA) system, a Wideband Code Division Multiple Access (WCDMA) General Packet Radio Service (GPRS) system, an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a future 5th-Generation (5G) communication system.

Each embodiment is described in the disclosure in combination with a terminal. The terminal may communicate with one or more core networks through a Radio Access Network (RAN), and the terminal may refer to User Equipment (UE), an access terminal, a user unit, a subscriber station, a mobile radio station, a mobile station, a remote station, a remote terminal, mobile equipment, a user terminal, a terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), handheld equipment with a wireless communication function, computing equipment, or other processing equipment connected to a wireless modem, vehicle-mounted equipment, wearable equipment, terminal equipment in a future 5G network and the like.

Each embodiment is described in the disclosure in combination with access network equipment. The access network equipment may be equipment configured to communicate with the terminal in an access network, and for example, may be a Base Transceiver Station (BTS) in a GSM or CDMA, may also be a NodeB (NB) in a WCDMA system, and may further be an Evolutional Node B (eNB or eNodeB) in an LTE system. Alternatively, the network equipment may be a relay station, an access point, vehicle-mounted equipment, wearable equipment, access network equipment in the future 5G network and the like.

Part of embodiments are described in the disclosure in combination with core network equipment. The core network equipment is mainly configured to provide a user connection, manage a user and complete bearing of a service, provides an interface to an external network and the like as a bearer network, and for example, may be a Serving Gate Way (SGW), a Packet Data Network (PDN) Gate Way (PGW), or another network element in a core network, wherein a PDN refers to a public data network.

It should be understood that an anchor handover method of the embodiments of the disclosure may be a part of flow in a base station handover flow, and handover of base stations may be completed by anchor handover, wherein an anchor refers to a base station with a control and decision-making right over a radio resource, and anchor handover refers to handover between base stations for the control and decision-making right.

FIG. 1 is an anchor handover method 100 according to an embodiment of the disclosure. As shown in FIG. 1, the method 100 may include the following operations.

In S101, a terminal reports a signal strength measurement result to a source base station, the signal strength measurement result including strength of a signal currently received by the terminal and sent by a base station (the source base station before handover) corresponding a serving cell and strength of a signal sent by a base station (including a target base station for handover) corresponding to another cell in the vicinity of the serving cell.

Specifically, the signal strength measurement result includes strength of a signal, currently received by the terminal, of a cell of the source base station and strength of a signal, currently received by the terminal, of a cell of the target base station. When reporting the signal strength measurement result, the terminal may perform reporting according to an existing process, which will not be limited in the embodiment of the disclosure.

Correspondingly, the source base station receives the signal strength measurement result reported by the terminal.

In S102, the source base station determines that the terminal needs to handover (or handover) to a base station (the target base station) corresponding to a target cell according to the signal strength measurement result reported by the terminal, and adds the target cell as an SCell to enable the source base station and the target base station to simultaneously send user data to the terminal.

The base station corresponding to the current serving cell may add the target cell as the SCell (or called as a "secondary transmission cell") through a multi-connectivity technology, that is, a Primary Cell (PCell) and the SCell are set. In other words, the serving cell of the source base station adds the cell corresponding to the target base station as the SCell through the multi-connectivity technology. When there is a PCell and an SCell, a technology adopted as a basis is a dual-connectivity technology. In addition, the SCell may also be added through another technology, which will not be limited in the embodiment of the disclosure.

Figure 2A:
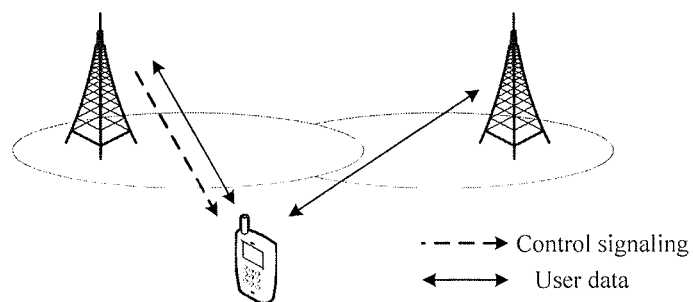
FIG. 2A, FIG. 2B and FIG. 2C are schematic diagrams of data transmission in an anchor handover process according to an embodiment of the disclosure.

Correspondingly to S103, S104 and FIG. 2A, at this moment, the user data may be scheduled through the PCell (the current serving cell, corresponding to the source base station), and is transmitted by the serving cell, may also be transmitted by the SCell (corresponding to the target base station), and may further be simultaneously transmitted by the serving cell and the target cell. Control signaling is transmitted to the terminal by the serving cell.

It should be understood that, in the embodiment of the disclosure, the source base station may simultaneously establish SCells with base stations to which one or more target cells belong according to the signal strength measurement result reported by the terminal, which will not be limited in the embodiment of the disclosure.

In S105, the source base station sends an anchor handover request message to the target base station, wherein the anchor handover request message is configured to request to handover a control and decision-making right from the source base station to the target base station. When the source base station establishes SCells with base stations to which multiple target cells belong, the source base station selects one target base station in the base stations corresponding to the multiple target cells to send the anchor handover request message, namely requesting to handover an RRC right from the source base station to the target base station, and in this process, a user data link is kept unchanged, and transmission is performed according to an existing configuration. Correspondingly, the target base station receives the anchor handover request message sent by the source base station.

Here, the anchor handover request message includes at least one of following information including context information of the terminal, system information of the serving cell and radio resource configuration information for the terminal, so that handover configuration may be performed for target information according to the information.

Optionally, in S106, after receiving the anchor handover request message sent by the source base station, the target base station may send a path switching request to core network equipment according to the anchor handover request message. The core network equipment may be a core network router, for example, an SGW or a PGW. The path switching request indicates the user data path to be switched from a path between the core network router and the source base station to a path between the core network router and the target base station. It should be understood that S106 may not be executed and S110 is executed instead, which will not be limited in the embodiment of the disclosure.

Figure 2B:
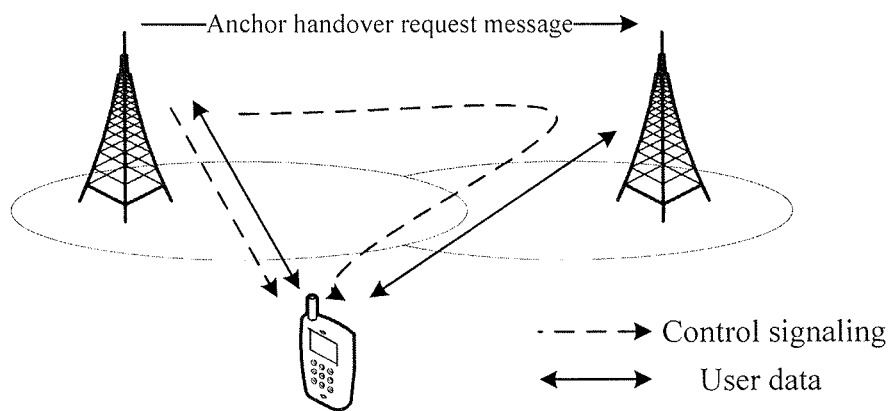

Optionally, correspondingly to FIG. 2B, after the source base station sends the anchor handover request message to the target base station and before the source base station receives an anchor handover acknowledgement message sent by the target base station, S107 may be executed, the source base station may directly send indication information to the terminal, the indication information may be configuration signaling, and indicates the terminal that a configuration about RRC has been handed over from the source base station to the target base station, and such an indication message includes information indicating that RRC of the source base station is released and information indicating that RRC of the target base station is established. In other words, the indication message includes related information about release of RRC connection control and related information about a connection configuration of the target cell, which are required to be sent to the terminal.

Or, S108 may be executed instead of S107, and the source base station may also send the indication message to the terminal through the target base station. That is, the target base station receives the indication message sent by the source base station, and forwards the indication message to the terminal.

It should be understood that, as shown in FIG. 2B, after the source base station sends the anchor handover request message to the target base station and before the anchor handover acknowledgement message sent by the target base station is received, the user data may be transmitted by the source base station and/or the target base station. Control signaling such as the indication message is determined by the source base station, that is, the source base station still have an RRC control right, and the control signaling may be directly sent to the terminal by the source base station, and may also be sent to the terminal through the target base station.

In S109, the target base station sends the anchor handover acknowledgement message to the source base station, wherein the anchor handover acknowledgement message is configured to acknowledge the anchor handover request message, and may specifically include information such as a radio bearer, which may be established on a target base station side, about the terminal and corresponding Quality of Service (QoS). Correspondingly, the source base station receives the anchor handover acknowledgement message sent by the target base station.

At the same time when the target base station sends the anchor handover acknowledgement message to the source base station in S109, S110 is executed, the target base station establishes an RRC connection control link with the terminal, and at this moment, the RRC control right is handed over from the source base station to the target base station.

S111 may be executed instead of S106, and after the source base station receives the anchor handover acknowledgement message sent by the target base station, the source base station sends the path switching request to the core network equipment according to the anchor handover acknowledgement message, so that the core network equipment may perform related configuration for handover.

Instead of S107 or S108, after the target base station sends the anchor handover acknowledgement message to the source base station in S109, S112 is executed, and the target base station sends the indication message described above to the terminal.

Or instead of S107, after the target base station sends the anchor handover acknowledgement message to the source base station in S109, S113 may be executed, and the target base station sends the indication message to the terminal through the source base station. That is, the source base station receives the indication message sent by the target base station, and forwards the indication message to the terminal.

Figure 2C:
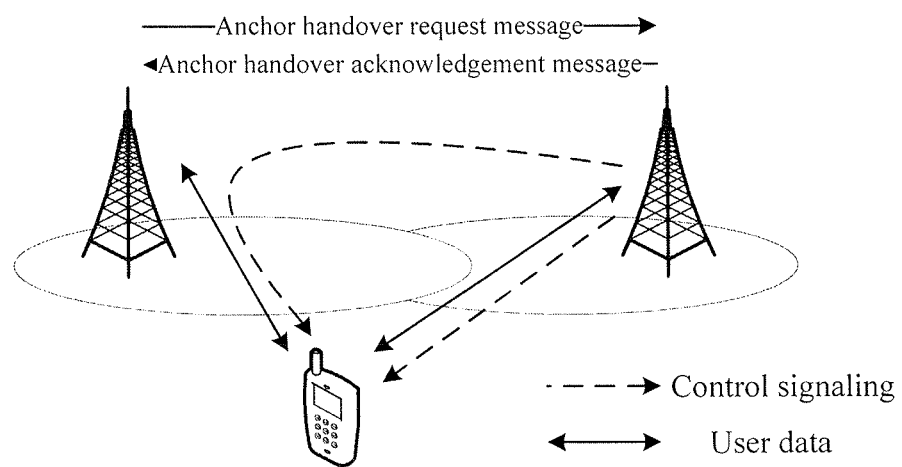

It should be understood that, as shown in FIG. 2C, after the target base station sends the anchor handover acknowledgement message to the source base station, the user data may be transmitted by the source base station and/or the target base station. The control signaling such as the indication message is determined by the target base station, that is, the RRC control right has been handed over from the source base station to the target base station, and the control signaling may be directly sent to the terminal by the target base station, and may also be sent to the terminal through the source base station.

In S114, when signal quality of the source base station is relatively poorer, the target base station with the RRC control right sends a release message to the terminal, wherein the release message is to indicate the terminal to release the source base station. Correspondingly, the terminal receives the release message sent by the target base station.

In S115, the terminal releases the source base station according to the release message. Specifically, the terminal may delete the original serving cell (the source base station) from a service list of the terminal.

It should be understood that an anchor handover request of the embodiment of the disclosure may be born in a handover request message in the conventional art, that is, the anchor handover request message may be the handover request message. Similarly, an anchor handover acknowledge may be born in a handover acknowledgement message in the conventional art, that is, the anchor handover acknowledgement message may be the handover acknowledgement message. In other words, the anchor handover request, anchor handover acknowledge and the like of the embodiment of the disclosure may be transmitted on the basis of the messages of the conventional art or by using new messages, which will not be limited in the embodiment of the disclosure.

It should be understood that, in each embodiment of the disclosure, a magnitude of a sequence number of each process does not mean an execution sequence, and the execution sequence of each process should be determined according to its function and an internal logic, and should not form any limit to an implementation process of the embodiment of the disclosure.

It should also be understood that some steps in the abovementioned solution may be mutually replaced or may be ignored. Each step may be combined according to logics to obtain the following solutions, for example, (S101, S102, S103 and/or S104, S105, S106, S107 or S108, S109, S110, S114, S115); or, (S101, S102, S103 and/or S104, S105, S107 or S108, S109, S110, S111, S114, S115); or (S101, S102, S103 and/or S104, S105, S106, S109, S110, S112 or S113, S114, S115); or (S101, S102, S103 and/or S104, S105, S109, S110, S111, S112 or S113, S114, S115). However, the embodiment of the disclosure is not limited.

According to the anchor handover method of the embodiment of the disclosure, operations of anchor handover request, path switching, anchor handover acknowledge, RRC connection control link establishment, source base station release and the like are executed on the basis of the multi-connectivity technology on the premise that the target cell is the current serving cell, so that the terminal may continue transmitting the user data at the same time of handover, and may also acquire control signaling from multiple base stations, smooth handover of the terminal is ensured, a handover latency is reduced, and user experience during handover is improved.

An anchor handover method 200 of an embodiment of the disclosure will be introduced below from the point of a target base station. As shown in FIG. 3, the method 200 includes the following operations.

In S201, a target base station receives an anchor handover request message sent by a source base station, wherein the source base station is a base station corresponding to a serving cell which currently provides service for a terminal and has a control and decision-making right, the target base station is a base station corresponding to an SCell which is controlled by the serving cell and currently provides service for the terminal, and the anchor handover request message is configured to request to handover the control and decision-making right to the target base station.

Here, S201 corresponds to S105 of the method 100, and its specific implementation will not be elaborated herein.

In S202, the target base station sends an anchor handover acknowledgement message to the source base station, wherein the anchor handover acknowledgement message is to acknowledge the anchor handover request message.

Here, S202 corresponds to S109 of the method 100, and its specific implementation will not be elaborated herein.

According to the anchor handover method of the embodiment of the disclosure, the cell of the target base station is the SCell of the cell of the source base station, and the target base station executes anchor handover request receiving and anchor handover acknowledge operations, so that the terminal may continue transmitting user data at the same time of handover, and may also acquire control signaling from multiple base stations, smooth handover of the terminal is ensured, a handover latency is reduced, and user experience during handover is improved.

In the embodiment of the disclosure, the method 200 may further include the following operations.

In S203, the target base station establishes an RRC connection control link with the terminal.

Here, S203 corresponds to S110 of the method 100, and its specific implementation will not be elaborated herein.

In S204, the target base station sends a release message to the terminal, wherein the release message is to indicate the terminal to release the source base station.

Here, S204 corresponds to S114 of the method 100, and its specific implementation will not be elaborated herein.

According to the anchor handover method of the embodiment of the disclosure, the cell of the target base station is the SCell of the cell of the source base station, and the target base station executes operations of anchor handover request, anchor handover acknowledge, RRC connection control link establishment, notification of the terminal for release of the source base station and the like, so that the terminal may continue transmitting the user data at the same time of handover, and may also acquire control signaling from multiple base stations, smooth handover of the terminal is ensured, the handover latency is reduced, and the user experience during handover is improved.

Optionally, as an embodiment, after the operation that the target base station sends the anchor handover acknowledgement message to the source base station in S202, the method 200 may further include that: the target base station sends an indication message to the terminal, the indication message including information indicating that RRC of the source base station is released and/or information indicating that RRC of the target base station is established. The step may correspond to S112 of the method 100, and its specific implementation will not be elaborated herein.

Correspondingly to S113 of the method 100, the operation that the target base station sends the indication message to the terminal may include that: the target base station sends the indication message to the terminal through the source base station.

Optionally, as another embodiment, after the operation that the target base station receives the anchor handover request message sent by the source base station in S201 and before the operation that the target base station sends the anchor handover acknowledgement message to the source base station in S202, the method 200 may further include that: the target base station receives an indication message sent by the source base station, the indication message including information indicating that RRC of the source base station is released and/or information indicating that RRC of the target base station is established; and the target base station forwards the indication message to the terminal. The step may correspond to S108 of the method 100, and its specific implementation will not be elaborated herein.

In each embodiment of the disclosure, after the operation that the target base station receives the anchor handover request message sent by the source base station in S201, the method 200 may further include that: the target base station sends a path switching request to core network equipment according to the anchor handover request message. The step may correspond to S106 of the method 100, and its specific implementation will not be elaborated herein.

In each embodiment of the disclosure, the anchor handover request message includes at least one of following information including context information of the terminal, system information of the serving cell and radio resource configuration information for the terminal.

An anchor handover method 300 of an embodiment of the disclosure will be introduced below from the point of a source base station. As shown in FIG. 4, the method 300 includes the following operations.

In S301, a source base station sends an anchor handover request message to a target base station. Here, the source base station is a base station corresponding to a serving cell which currently provides service for a terminal and has a control and decision-making right, the target base station is a base station corresponding to an SCell which is controlled by the serving cell and currently provides service for the terminal, and the anchor handover request message is configured to request to handover the control and decision-making right to the target base station.

Here, S301 corresponds to S105 of the method 100, and its specific implementation will not be elaborated herein.

In S302, the source base station receives an anchor handover acknowledgement message sent by the target base station, wherein the anchor handover acknowledgement message is to acknowledge the anchor handover request message.

Here, S302 corresponds to S109 of the method 100, and its specific implementation will not be elaborated herein.

According to the anchor handover method of the embodiment of the disclosure, the cell of the target base station is the SCell of the cell of the source base station, and the source base station executes anchor handover request and anchor handover acknowledge receiving operations, so that the terminal may continue transmitting user data at the same time of handover, and may also acquire control signaling from multiple base stations, smooth handover of the terminal is ensured, a handover latency is reduced, and user experience during handover is improved.

Optionally, as an embodiment, after the operation that the source base station sends the anchor handover request message to the target base station in S301 and before the operation that the source base station receives the anchor handover acknowledgement message sent by the target base station in S302, the method 300 may further include that: the source base station sends an indication message to the terminal, the indication message including information indicating that RRC of the source base station is released and/or information indicating that RRC of the target base station is established.

The step may correspond to S107 of the method 100, and its specific implementation will not be elaborated herein.

In the embodiment of the disclosure, the operation that the source base station sends the indication message to the terminal may include that: the source base station sends the indication message to the terminal through the target base station. The step may correspond to S108 of the method 100, and its specific implementation will not be elaborated herein.

Optionally, as another embodiment, after the operation that the source base station receives the anchor handover acknowledgement message sent by the target base station in S302, the method 300 may further include that: the source base station receives an indication message sent by the target base station, the indication message including information indicating that RRC of the source base station is released and/or information indicating that RRC of the target base station is established; and the source base station forwards the indication message to the terminal. The step may correspond to S113 of the method 100, and its specific implementation will not be elaborated herein.

In each embodiment of the disclosure, before the operation that the source base station sends the anchor handover request message to the target base station in S301, the method 300 may further include that: the source base station receives a signal strength measurement result reported by the terminal, the signal strength measurement result including strength of a signal which is currently received by the terminal from the cell of the source base station and strength of a signal which is currently received by the terminal from the cell of the target base station; and when the source base station determines that the terminal needs to handover to the target base station according to the signal strength measurement result, the source base station adds the cell corresponding to the target base station as the SCell to enable the source base station and the target base station to simultaneously send user data to the terminal.

The above step may correspond to S101 and S102 of the method 100, and its specific implementation will not be elaborated herein.

In each embodiment of the disclosure, after the operation that the source base station receives the anchor handover acknowledgement message sent by the target base station in S302, the method 300 may further include that: the source base station sends a path switching request to core network equipment according to the anchor handover acknowledgement message. The step may correspond to S111 of the method 100, and its specific implementation will not be elaborated herein.

In each embodiment of the disclosure, the anchor handover request message includes at least one of following information including context information of the terminal, system information of the serving cell and radio resource configuration information for the terminal.

Figure 5:
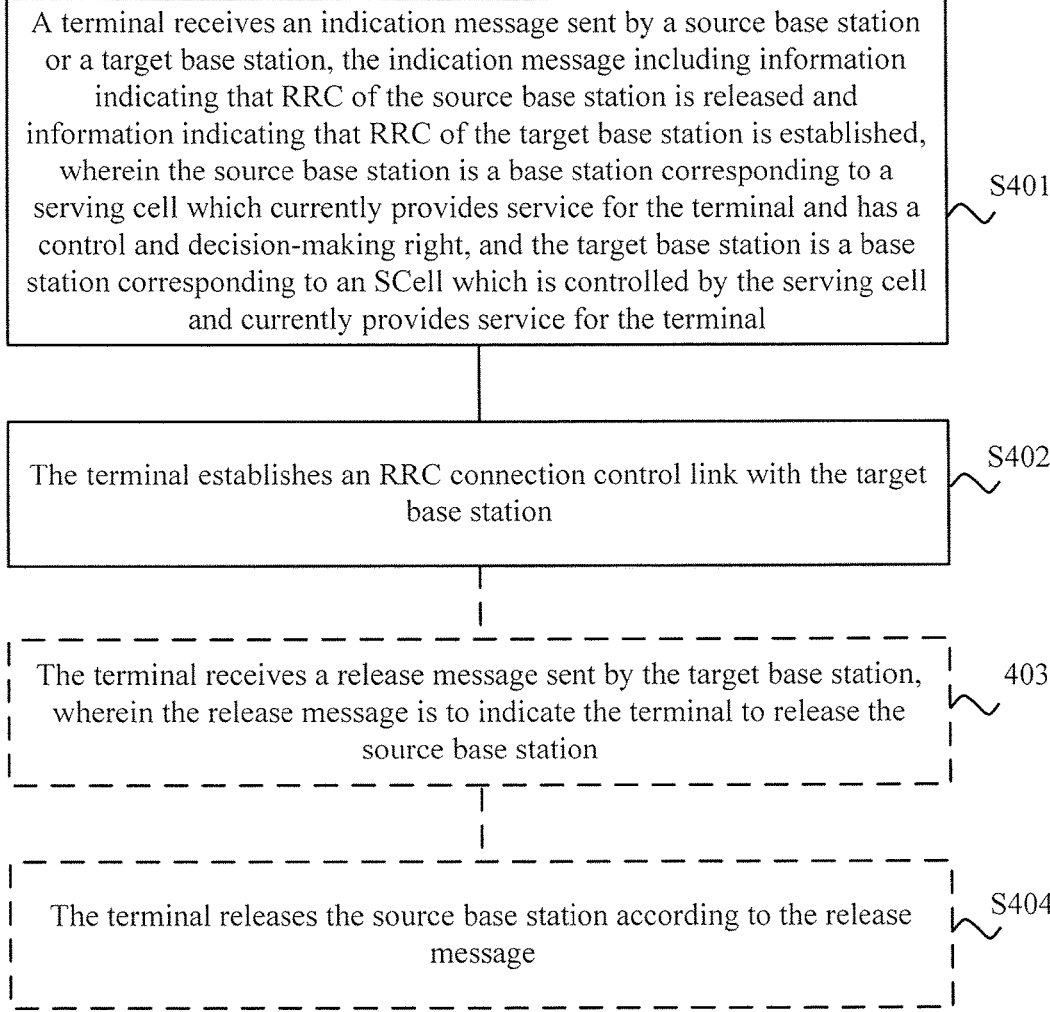
FIG. 5 is a schematic flowchart of an anchor handover method according to another embodiment of the disclosure.

An anchor handover method 400 of an embodiment of the disclosure will be introduced below from the point of a terminal. As shown in FIG. 5, the method 400 includes the following operations.

In S401, a terminal receives an indication message sent by a source base station or a target base station, the indication message including information indicating that RRC of the source base station is released and information indicating that RRC of the target base station is established. Here, the source base station is a base station corresponding to a serving cell which currently provides service for the terminal and has a control and decision-making right, and the target base station is a base station corresponding to an SCell which is controlled by the serving cell and currently provides service for the terminal.

Here, S401 may correspond to S107, S108, S112 or S113 of the method 100, and its specific implementation will not be elaborated herein.

In S402, the terminal establishes an RRC connection control link with the target base station.

Here, S402 may correspond to S110 of the method 100, and its specific implementation will not be elaborated herein.

According to the anchor handover method of the embodiment of the disclosure, the terminal receives the indication message sent by the base station for configuration in a handover process, and establishes the RRC connection control link, so that the terminal may continue transmitting user data at the same time of handover, and may also acquire control signaling from multiple base stations, smooth handover of the terminal is ensured, a handover latency is reduced, and user experience during handover is improved.

In the embodiment of the disclosure, the method 400 may further include the following operations.

In S403, the terminal receives a release message sent by the target base station, wherein the release message is to indicate the terminal to release the source base station.

Here, S403 may correspond to S114 of the method 100, and its specific implementation will not be elaborated herein.

In S404, the terminal releases the source base station according to the release message.

Here, S404 may correspond to S115 of the method 100, and its specific implementation will not be elaborated herein.

According to the anchor handover method of the embodiment of the disclosure, the terminal receives the indication message sent by the base station for configuration in the handover process, establishes the RRC connection control link, and releases the source base station, so that the terminal may continue transmitting the user data at the same time of handover, and may also acquire control signaling from multiple base stations, smooth handover of the terminal is ensured, the handover latency is reduced, and the user experience during handover is improved.

In the embodiment of the disclosure, before the operation that the terminal receives the indication message sent by the source base station or the target base station in S401, the method 400 may further include that:

the terminal reports a signal strength measurement result to the source base station, the signal strength measurement result including strength of a signal which is currently received by the terminal from the cell of the source base station and strength of a signal which is currently received by the terminal from the cell of the target base station. Therefore, when the source base station determines that the terminal needs to handover to the target base station according to the signal strength measurement result, the source base station adds the cell corresponding to the target base station as the SCell to enable the source base station and the target base station to simultaneously send the user data to the terminal.

It should be understood that, in each embodiment of the disclosure, a magnitude of a sequence number of each process does not mean an execution sequence, and the execution sequence of each process should be determined according to its function and an internal logic, and should not form any limit to an implementation process of the embodiment of the disclosure.

The anchor handover method of the embodiments of the disclosure is described above in detail, and an anchor handover base station and terminal of the embodiments of the disclosure will be described below.

Figure 6:
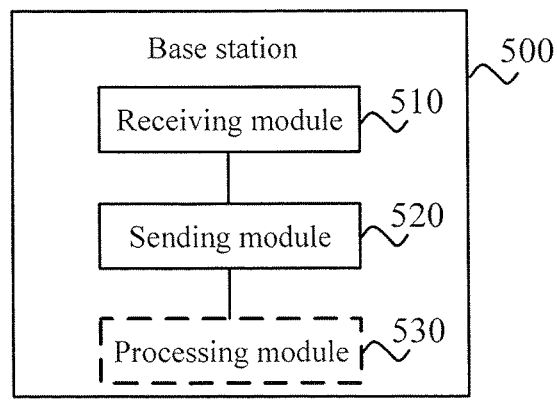
FIG. 6 is a schematic block diagram of a base station according to an embodiment of the disclosure.

FIG. 6 is a schematic block diagram of a base station 500 according to an embodiment of the disclosure. The base station 500 is a target base station, and the base station 500 includes a receiving module 510 and a sending module 520.

The receiving module 510 is configured to receive an anchor handover request message sent by a source base station. Here, the source base station is a base station corresponding to a serving cell which currently provides service for a terminal and has a control and decision-making right, the target base station is a base station corresponding to an SCell which is controlled by the serving cell and currently provides service for the terminal, and the anchor handover request message is configured to request to handover the control and decision-making right to the target base station.

The sending module 520 is configured to send an anchor handover acknowledgement message to the source base station, the anchor handover acknowledgement message is configured to acknowledge the anchor handover request message received by the receiving module 510.

According to the base station of the embodiment of the disclosure, the cell of the target base station is the SCell of the cell of the source base station, and the target base station executes anchor handover request receiving and anchor handover acknowledge operations, so that the terminal may continue transmitting user data at the same time of handover, and may also acquire control signaling from multiple base stations, smooth handover of the terminal is ensured, a handover latency is reduced, and user experience during handover is improved.

Optionally, in the embodiment of the disclosure, the base station 500 may further include a processing module 530.

The processing module 530 is configured to establish an RRC connection control link with the terminal.

The sending module 520 may further be configured to:
send a release message to the terminal, wherein the release message is to indicate the terminal to release the source base station.

Optionally, as an embodiment, the sending module 520 may further be configured to:
after the sending module 520 sends the anchor handover acknowledgement message to the source base station, send an indication message to the terminal, the indication message including information indicating that RRC of the source base station is released and/or information indicating that RRC of the target base station is established.

Optionally, the sending module 520 may specifically be configured to:
send the indication message to the terminal through the source base station.

Optionally, as another embodiment, the receiving module 510 may further be configured to:
after the receiving module 510 receives the anchor handover request message sent by the source base station and before the sending module sends the anchor handover acknowledgement message to the source base station, receive an indication message sent by the source base station, the indication message including information indi-cating that RRC of the source base station is released and/or information indicating that RRC of the target base station is established.

The sending module 520 may further be configured to:
forward the indication message to the terminal.

Optionally, in the embodiment of the disclosure, the sending module 520 may further be configured to:
after the receiving module 510 receives the anchor handover request message sent by the source base station, send a path switching request to core network equipment according to the anchor handover request message.

Optionally, in the embodiment of the disclosure, the anchor handover request message includes at least one of following information including context information of the terminal, system information of the serving cell and radio resource configuration information for the terminal.

Figure 7:
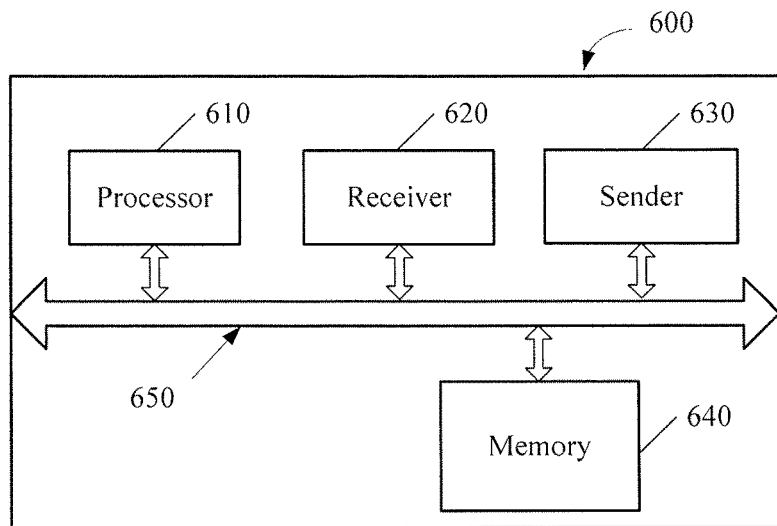
FIG. 7 is a schematic block diagram of a base station according to another embodiment of the disclosure.

It is to be noted that, in the embodiment of the disclosure, the receiving module 510 may be implemented by a receiver, the sending module 520 may be implemented by a sender, and the processing module 530 may be implemented by a processor. As shown in FIG. 7, a base station 600 may include a processor 610, a receiver 620, a sender 630 and a memory 640. Here, the memory 640 may be configured to store codes executed by the processor 610 and the like.

Various components in the base station 600 are coupled together through a bus system 650. Here, the bus system 650 includes a data bus, and further includes a power bus, a control bus and a state signal bus.

The base station 500 shown in FIG. 6 or the base station 600 shown in FIG. 7 may implement each process implemented in the embodiments of FIG. 1 to FIG. 5, which will not be elaborated herein to avoid repetition.

It is to be noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. Here, the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 8:
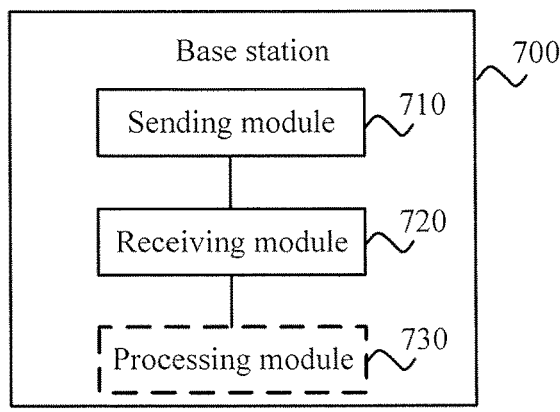
FIG. 8 is a schematic block diagram of a base station according to another embodiment of the disclosure.

FIG. 8 is a schematic block diagram of a base station 700 according to another embodiment of the disclosure. The base station 700 is a source base station, and the base station 700 includes a sending module 710 and a receiving module 720.

The sending module 710 is configured to send an anchor handover request message to a target base station. Here, the source base station is a base station corresponding to a serving cell which currently provides service for a terminal and has a control and decision-making right, the target base station is a base station corresponding to an SCell which is controlled by the serving cell and currently provides service for the terminal, and the anchor handover request message is configured to request to handover the control and decision-making right to the target base station.

The receiving module 720 is configured to receive an anchor handover acknowledgement message sent by the target base station, wherein the anchor handover acknowledgement message is to acknowledge the anchor handover request message sent by the sending module 710.

According to the base station of the embodiment of the disclosure, the cell of the target base station is the SCell of the cell of the source base station, and the source base station executes anchor handover request and anchor handover acknowledge receiving operations, so that the terminal may continue transmitting user data at the same time of handover, and may also acquire control signaling from multiple base stations, smooth handover of the terminal is ensured, a handover latency is reduced, and user experience during handover is improved.

Optionally, as an embodiment, the sending module 710 may further be configured to:

after the sending module 710 sends the anchor handover request message to the target base station and before the receiving module 720 receives the anchor handover acknowledgement message sent by the target base station, send an indication message to the terminal, the indication message including information indicating that RRC of the source base station is released and/or information indicating that RRC of the target base station is established.

Optionally, the sending module 710 may specifically be configured to:

send the indication message to the terminal through the target base station.

Optionally, as another embodiment, the receiving module 720 may further be configured to:

after the receiving module 720 receives the anchor handover acknowledgement message sent by the target base station, receive an indication message sent by the target base station, the indication message including information indicating that RRC of the source base station is released and/or information indicating that RRC of the target base station is established.

In addition, the sending module 710 may further be configured to:

forward the indication message to the terminal.

Optionally, in the embodiment of the disclosure, the receiving module 720 may further be configured to:

before the sending module 710 sends the anchor handover request message to the target base station, receive a signal strength measurement result reported by the terminal, the signal strength measurement result including strength of a signal which is currently received by the terminal from the cell of the source base station and strength of a signal which is currently received by the terminal from the cell of the target base station.

The base station 700 may further include a processing module 730.

The processing module 730 is configured to, when it is determined that the terminal needs to handover to the target base station according to the signal strength measurement result, add the cell corresponding to the target base station as the SCell to enable the source base station and the target base station to simultaneously send user data to the terminal.

Optionally, in the embodiment of the disclosure, the sending module 710 may further be configured to:

after the receiving module 720 receives the anchor handover acknowledgement message sent by the target base station, send a path switching request to core network equipment according to the anchor handover acknowledgement message.

Optionally, in the embodiment of the disclosure, the anchor handover request message includes at least one of following information including context information of the terminal, system information of the serving cell and radio resource configuration information for the terminal.

Figure 9:
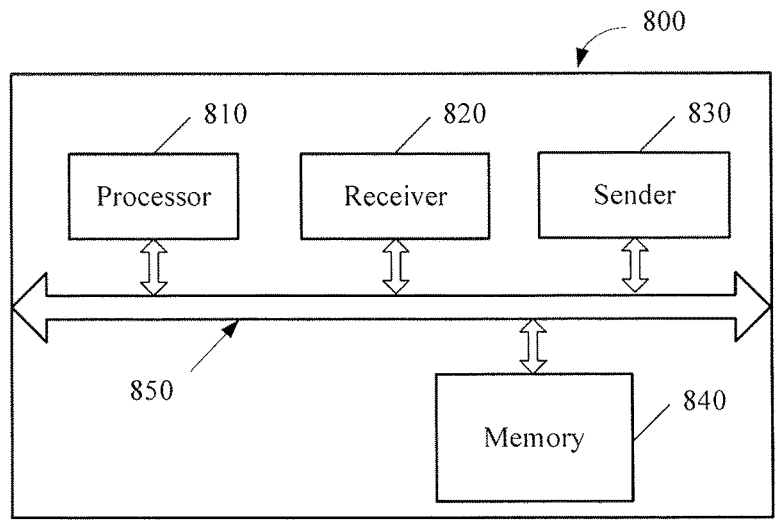
FIG. 9 is a schematic block diagram of a base station according to another embodiment of the disclosure.

It is to be noted that, in the embodiment of the disclosure, the receiving module 720 may be implemented by a receiver, the sending module 710 may be implemented by a sender, and the processing module 730 may be implemented by a processor. As shown in FIG. 9, a base station 800 may include a processor 810, a receiver 820, a sender 830 and a memory 840. Here, the memory 840 may be configured to store codes executed by the processor 810 and the like.

Various component in the base station 800 are coupled together through a bus system 850. Here, the bus system 850 includes a data bus, and further includes a power bus, a control bus and a state signal bus.

The base station 700 shown in FIG. 8 or the base station 800 shown in FIG. 9 may implement each process implemented in the embodiments of FIG. 1 to FIG. 5, which will not be elaborated herein to avoid repetition.

Figure 10:
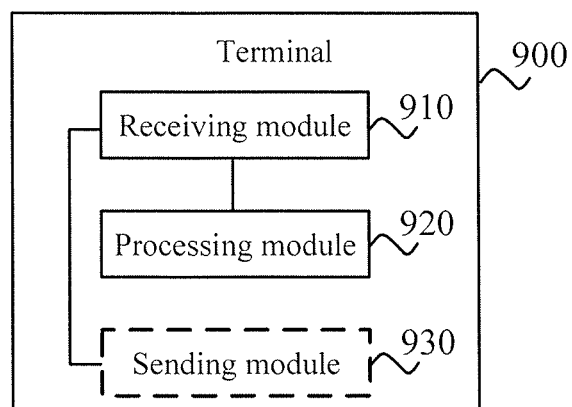
FIG. 10 is a schematic block diagram of a terminal according to an embodiment of the disclosure.

FIG. 10 is a schematic block diagram of a terminal 900 according to an embodiment of the disclosure. The terminal 900 includes a receiving module 910 and a processing module 920.

The receiving module 910 is configured to receive an indication message sent by a source base station or a target base station, the indication message including information indicating that RRC of the source base station is released and information indicating that RRC of the target base station is established. Here, the source base station is a base station corresponding to a serving cell which currently provides service for the terminal and has a control and decision-making right, and the target base station is a base station corresponding to an SCell which is controlled by the serving cell and currently provides service for the terminal.

The processing module 920 is configured to establish an RRC connection control link with the target base station.

The terminal of the embodiment of the disclosure receives the indication message sent by the base station for configuration in a handover process, and establishes the RRC connection control link, so that the terminal may continue transmitting user data at the same time of handover, and may also acquire control signaling from multiple base stations, smooth handover of the terminal is ensured, a handover latency is reduced, and user experience during handover is improved.

Optionally, in the embodiment of the disclosure, the receiving module 910 may further be configured to:

receive a release message sent by the target base station, wherein the release message is to indicate the terminal to release the source base station.

In addition, the processing module 920 may further be configured to:

release the source base station according to the release message received by the receiving module 910.

Optionally, in the embodiment of the disclosure, the terminal 900 may further include a sending module 930.

The sending module 930 is configured to, before the receiving module 910 receives the indication message sent by the source base station or the target base station, report a signal strength measurement result to the source base station, the signal strength measurement result including strength of a signal which is currently received by the terminal from the cell of the source base station and strength of a signal which is currently received by the terminal from the cell of the target base station.

Figure 11:
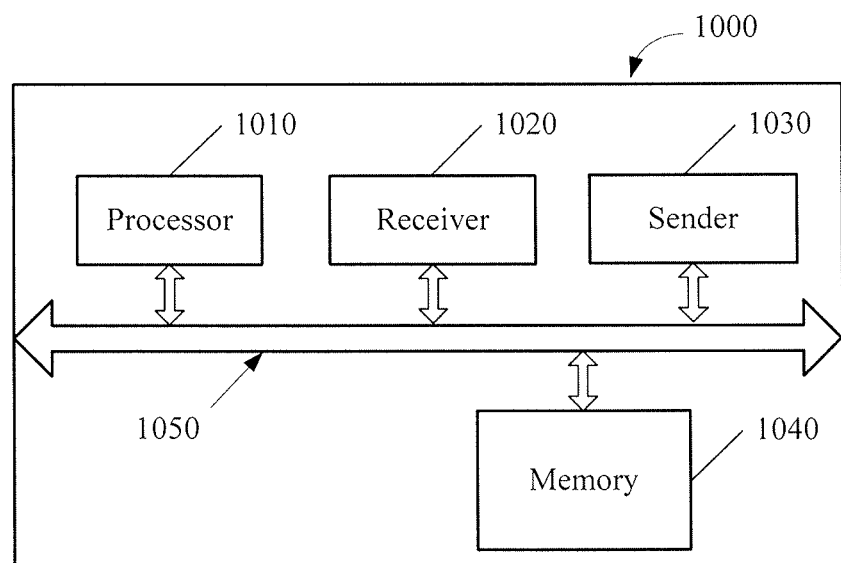
FIG. 11 is a schematic block diagram of a terminal according to another embodiment of the disclosure.

It is to be noted that, in the embodiment of the disclosure, the receiving module 910 may be implemented by a receiver, the sending module 930 may be implemented by a sender, and the processing module 920 may be implemented by a processor. As shown in FIG. 11, a terminal 1000 may include a processor 1010, a receiver 1020, a sender 1030 and a memory 1040. Here, the memory 1040 may be configured to store codes executed by the processor 1010 and the like.

Various components in the terminal 1000 are coupled together through a bus system 1050. Here, the bus system 1050 includes a data bus, and further includes a power bus, a control bus and a state signal bus.

The terminal 900 shown in FIG. 10 or the terminal 1000 shown in FIG. 11 may implement various processes implemented in the embodiments of FIG. 1 to FIG. 5, which will not be elaborated herein to avoid repetition.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments for convenient and brief description and will not be elaborated herein.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, various function units in each embodiment of the disclosure may be integrated into a processing unit, various units may also exist independently, or two or more units may be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or handovers apparent to those skilled in the art within the technical scope disclosed by the disclosure shall fall within the scope of protection of the disclosure. Therefore, the scope of protection of the disclosure shall be defined by the scope of protection of the claims.

The invention claimed is:

1. A handover method, comprising:

receiving, by a target base station, a handover request message sent by a source base station, wherein the source base station is a Master Node (MN) corresponding to a serving cell which currently provides service for a terminal and determines UE RRC (Radio Resource Control state or terminates S1 interface, the target base station is a Second Node (SN) corresponding to Secondary Cell(s) which comprises PSCell and SCell and is controlled by the serving cell and currently provides service for the terminal, and the handover request message is configured to request to handover the RRC state decision control or S1 termination to the target base station; and sending, by the target base station, a handover acknowledgement message to the source base station, wherein the handover acknowledgement message is to acknowledge the handover request message;

wherein before receiving, by the target base station, the handover request message sent by the source base station, user data sent to the terminal is simultaneously sent by the serving cell corresponding to the source base station and the Secondary Cell(s) corresponding to the target base station.

2. The method according to claim 1, further comprising:

establishing, by the target base station, a RRC connection control with the terminal; and sending, by the target base station, a release message to the terminal, wherein the release message is to indicate the terminal to release the source base station.

3. The method according to claim 2, after sending, by the target base station, the handover acknowledgement message to the source base station, further comprising:
sending, by the target base station, an indication message to the terminal, the indication message comprising information indicating that RRC of the source base station is released and/or information indicating that RRC of the target base station is established.

4. The method according to claim 2, after receiving, by the target base station, the handover request message sent by the source base station and before sending, by the target base station, the handover acknowledgement message to the source base station, further comprising:
receiving, by the target base station, an indication message sent by the source base station, the indication message comprising information indicating that RRC of the source base station is released and/or information indicating that RRC of the target base station is configured; and
forwarding, by the target base station, the indication message to the terminal.

5. The method according to claim 2, after receiving, by the target base station, the handover request message sent by the source base station, further comprising:
sending, by the target base station, a path switching request to core network equipment according to the handover request message.

6. The method according to claim 1, after sending, by the target base station, the handover acknowledgement message to the source base station, further comprising:
sending, by the target base station, an indication message to the terminal, the indication message comprising information indicating that RRC of the source base station is released and/or information indicating that RRC of the target base station is established.

7. The method according to claim 6, wherein sending, by the target base station, the indication message to the terminal comprises:
sending, by the target base station, the indication message to the terminal through the source base station.

8. The method according to claim 1, after receiving, by the target base station, the handover request message sent by the source base station and before sending, by the target base station, the handover acknowledgement message to the source base station, further comprising:
receiving, by the target base station, an indication message sent by the source base station, the indication message comprising information indicating that RRC of the source base station is released and/or information indicating that RRC of the target base station is established; and
forwarding, by the target base station, the indication message to the terminal.

9. The method according to claim 1, after receiving, by the target base station, the handover request message sent by the source base station, further comprising:
sending, by the target base station, a path switching request to core network equipment according to the handover request message.

10. The method according to claim 1, wherein the request message comprises at least one of following information comprising context information of the terminal, system information of the serving cell and radio resource configuration information for the terminal.

11. A handover method, comprising:
sending, by a source base station, a handover request message to a target base station, wherein the source base station is a Master Node (MN) corresponding to a serving cell which determines UE RRC (Radio Resource Control) state or terminates S1 interface, the target base station is a Second Node (SN) corresponding to Secondary Cell(s) which comprises PSCell and SCell and is controlled by the serving cell and currently provides service for the terminal, and the handover request message is configured to request to handover the RRC state decision control or S1 termination to the target base station; and
receiving, by the source base station, a handover acknowledgement message sent by the target base station, wherein the handover acknowledgement message is to acknowledge the handover request message;
wherein before sending, by the source base station, the handover request message to the target base station, user data sent to the terminal is simultaneously sent by the serving cell corresponding to the source base station and the Secondary Cell(s) corresponding to the target base station.

12. The method according to claim 11, after sending, by the source base station, the handover request message to the target base station and before receiving, by the source base station, the handover acknowledgement message sent by the target base station, further comprising:
sending, by the source base station, an indication message to the terminal, the indication message comprising information indicating RRC of the source base station is released and/or information indicating that RRC of the target base station is established.

13. The method according to claim 12, wherein sending, by the source base station, the indication message to the terminal comprises:
sending, by the source base station, the indication message to the terminal through the target base station.

14. The method according to claim 11, after receiving, by the source base station, the handover acknowledgement message sent by the target base station, further comprising:
receiving, by the source base station, an indication message sent by the target base station, the indication message comprising information indicating that RRC of the source base station is released and/or information indicating that RRC of the target base station is established; and
forwarding, by the source base station, the indication message to the terminal.

15. The method according to claim 11, before sending, by the source base station, the handover request message to the target base station, further comprising:
receiving, by the source base station, a signal strength measurement result reported by the terminal, the signal strength measurement result comprising strength of a signal which is currently received by the terminal from the cell of the source base station and strength of a signal which is currently received by the terminal from the cell of the target base station; and
when the source base station determines that the terminal needs to handover to the target base station according to the signal strength measurement result, adding, by the source base station, the target base station as the Secondary node comprising secondary cell(s) to enable the source base station and the target base station to simultaneously send user data to the terminal.

16. The method according to claim 11, after receiving, by the source base station, the handover acknowledgement message sent by the target base station, further comprising:

sending, by the source base station, a path switching request to core network equipment according to the handover acknowledgement message.

17. The method according to claim 11, wherein the handover request message comprises at least one of following information comprising context information of the terminal, system information of the serving cell and radio resource configuration information for the terminal.

18. A handover method, comprising:

receiving, by a terminal, an indication message sent by a source base station or a target base station, the indication message comprising information indicating that Radio Resource Control (RRC) of the source base station is released and/or information indicating that RRC of the target base station is established, wherein the source base station is a Master Node (MN) corresponding to a serving cell which currently provides service for the terminal and determines UE RRC date or terminates S1 interface, and the target base station is a Second Node (SN) corresponding to Secondary Cell (s) which comprises PSCell and SCell and is controlled by the serving cell and currently provides service for the terminal; and establishing, by the terminal, an RRC connection control with the target base station;

wherein before receiving, by the terminal, the indication message sent by the source base station or the target base station, the method further comprises: receiving, by the terminal, user data simultaneously sent by the serving cell corresponding to the source base station and the Secondary Cell(s) corresponding to the target base station.

19. The method according to claim 18, further comprising:

receiving, by the terminal, a release message sent by the target base station, the release message indicating the terminal to release the source base station; and releasing, by the terminal, the source base station according to the release message.

20. The method according to claim 18, before receiving, by the terminal, the indication message sent by the source base station or the target base station, further comprising:

reporting, by the terminal, a signal strength measurement result to the source base station, measurement result comprising strength of a signal which is currently received by the terminal from the cell of the source base station and strength of a signal which is currently received by the terminal from the cell of the target base station.

* * * * *